United States Patent [19]

Koptis et al.

[11] Patent Number: 4,970,969
[45] Date of Patent: Nov. 20, 1990

[54] SMOKELESS PYROLYSIS FURNACE WITH MICRO-RAMPED TEMPERATURE CONTROLLED BY WATER-SPRAY

[75] Inventors: Robert A. Koptis, Brookpark; Robert F. Heran, Westlake, both of Ohio

[73] Assignee: Armature Coil Equipment, Inc., Cleveland, Ohio

[21] Appl. No.: 496,866

[22] Filed: Mar. 21, 1990

[51] Int. Cl.$^5$ .............................................. F23N 5/02
[52] U.S. Cl. .................................. 110/190; 110/214; 110/236; 110/345; 110/346
[58] Field of Search ............... 110/345, 346, 190, 348, 110/214, 236

[56] References Cited

U.S. PATENT DOCUMENTS 4,557,203 12/1985 Mainord .......................... 110/190 X
4,751,886  6/1988 Koptis et al. ........................ 110/190
4,827,855  5/1989 Koptis et al. ................... 110/190 X Primary Examiner—Edward G. Favors
Attorney, Agent, or Firm—Alfred D. Lobo

[57] ABSTRACT

A batch-type pyrolysis furnace burns a load of organic combustibles on metal parts without a significant risk of explosion because of a combination of two necessary conditions: (a) a primary water spray is maintained during a large portion of the burn cycle while the main burner is neither turned off nor attenuated until a major portion of the load is combusted; and, (b) the temperature in the main chamber is controlled by a "micro-ramped" programmable temperature controller (PC). By setting the ramp for micro-steps of no more than 2° F. per minute, and actuating the primary water spray to maintain the set-point temperature while it is ramped upward, the criticality of the location for the single thermocouple is obviated, and it is unnecessary to measure the temperature in the throat. The micro-steps eliminate soak periods during the ramp. The main "burn" progresses during the ramp, and at the upper set-point of the ramp (say 800°) with normal fuel supply to the main burner ("high-fire"). The final portion of the burn is completed with the main burner being starved of fuel ("low-fire"). The set-point is maintained within the specified narrow range during the main burn with the primary water spray. If the temperature deviates beyond a specified higher temperature (say by 10° F.) a secondary water spray is actuated by the PC. An afterburner burns volatiles generated in the furnace's main chamber. The effluent from the exhaust stack is essentially free of smoke. No catalyst or catalytic device is used to purify the smoke. The main chamber TC and interactive PC thus maintain a fire under controlled temperature conditions in the main chamber without an explosion.

10 Claims, 5 Drawing Sheets

120 VOLT 1 PHASE

SMOKELESS PYROLYSIS FURNACE WITH MICRO-RAMPED TEMPERATURE CONTROLLED BY WATER-SPRAY

BACKGROUND OF THE INVENTION

This invention relates to a control system for a batch-type pyrolysis furnace of the type used for volatilizing and burning organic material from a metal part to which the organic material is bonded. Volatiles (referred to herein as "vapor") not burned in the furnace's main chamber are burned in an incineration zone provided by an afterburner chamber in open communication with the main chamber, such communication being provided by a passage referred to as the "throat". The remaining metal part is reclaimed for reuse because the cost of reclamation is less than that of making the metal part anew. Such reclamation by pyrolysis has evolved into a subindustry of considerable economic significance not only because pyrolysis is cost-effective, but also because incineration of the vapor of polymeric materials which are not economically recyclable, conveniently and beneficially disposes of them.

A highly successful control system for a pyrolysis furnace in which incineration occurs in the main chamber and also downstream of the afterburner is provided in our U.S. Pat. No. 4,649,834. This system uses a single water spray system controlled by a first thermocouple (TC) in the main chamber (main chamber TC), a second thermocouple in the stack (stack TC) which controls only on/off or attenuated operation of the main burner and a third thermocouple (throat TC) in the vent passage ("throat") connecting the main chamber to the afterburner chamber. The effectiveness of this control system, in large measure, derives from the difference in temperatures sensed by the first and third thermocouples.

An even more effective furnace and control system is provided in our U.S. Pat. No. 4,759,298. In this system a single thermocouple (zone TC) senses the instantaneous temperature in a critical sensitive zone (CSZ) of the furnace and in cooperation with a programmable controller (PC), maintains a preselected ramp and soak temperature profile over the entire burn cycle. The CSZ was found to be within about 1 foot from the upper edge of the throat, and lower than about 6" (inches) from the ceiling of the main chamber. When the temperature required by the profile was exceeded, a single water spray actuated by a signal from the PC lowered the temperature below the preset profile. The zone TC thus maintains a fire under controlled temperature conditions in the main chamber without an explosion, using a single TC in the control system.

The '298 pyrolysis furnace, like the one of this invention, generated a characteristic smokeless discharge into the atmosphere under normal conditions of commercial operation. By "discharge" we refer to combustion products issuing from the furnace's stack, and by "smokeless" we refer to the discharge being substantially clear to the naked eye, that is, permeable to light in the visible wavelength range. The problem was that, when burning solvent-rich paints and volatile hydrocarbon rubbers, occasionally, there were explosions.

We stated in our '298 patent that "The required ramp may consist of a single ramp, or plural ramps, and the one or more ramps may be executed with no soak periods, if a soak period is unnecessary, or plural soak periods." We preferred 4 ramps and 4 soak periods, and as in our '834 patent, shut off the main burner when the water spray was actuated to lower the temperature when it rose above the desired profile, as this was the rational thing to do to lower temperature.

We typically used a ramp at more than 2° F. per minute, and did not recognize the critical effect that the rate of ramping had on control of the burn, despite controlling the ramp with one or more water sprays, because we switched off the main burner to help control rising temperature. Though switching off the main burner effectively lowered the temperature, we did not realize the burning load was still hot enough to ignite vapors building up in the main chamber explosively. This was not a problem as long as the main chamber was sealed against leakage of air (oxygen) into it. But we found that it was not practical to seal the main chamber in such a way as to prevent explosions. With the foregoing '298 system, we found we had to confine the single TC to the CSZ in the main chamber. We did not know the criticality of the location of the TC was related to the rate of ramp. It simply did not occur to us that we should lower the temperature without shutting off the main burner during a "burn" while at the same time keeping the water spray ON, for the sole purpose of having an excess of oxygen in the main chamber at all times. If there is an excess of oxygen at all times during the burn, we found that there is no sudden buildup of volatiles, hence no explosion.

We accidentally discovered that we could lower the temperature as just stated, if we staged the main burner while it stayed ON. We could keep the main burner on "high-fire", that is, burning a full, normal, fuel supply, which did not permit the build-up of volatiles in the main chamber, and despite being on "high-fire" we could simultaneously decrease the temperature, provided we sprayed enough water on the load. Further, though keeping the main burner ON seemed to be the wrong thing to do to lower the temperature in the main chamber, we found that, if the steps of the ramp were small enough (hence "micro-ramped"), we could get to the desired set-point temperature where the main burn was to occur, while keeping the main burner on high-fire and maintaining a primary water spray for a substantial portion of the time it took to ramp the temperature to the set-point.

Moreover, the ramp being controlled only by a preselected microstep of no more than 2° F./min, preferably less, the gradient of the ramp depended on the amount of heat generated per unit weight of organic burnables per unit of time, referred to as the "heat generation factor" ("HGF" for brevity). The HGF for various burnables is evaluated on a relative scale, the HGF for a specific butyl rubber such as is used in automotive motor mounts being 1, on a scale of 10. Metal fixtures coated with asphalt or enamel paint have an HGF of about 5; with lacquer or epoxy paint, about 6; with polyurethane, about 7 to 8; and, with nitrocellulose paint about 9. Knowing the general nature of the burnables and the HGF, the time for the main burn would be set by trial and error, once the set-point was reached.

This invention is specifically directed to obviating explosions when burning highly combustible, relatively large loads of metal parts combined with silicone-free polymers ("burnables") which are to be incinerated without an explosion, and smokelessly, in a relatively small main chamber, that is, with a relatively high ratio of load (lb)/volume (ft$^3$), referred to as the load/volume ratio. Such loads contain from 0.1 lb of burnables per lb of metal, to 2 lb burnables/lb metal, and are referred to as "high-polymer" loads in contrast to conventional loads which contain less than 0.1 lb burnables/lb of metal.

The term "pyrolysis oven" has been used in the art, by others, to indicate that there is no incineration of organic material on the metal parts within the oven's main chamber. The material is simply volatilized (or vaporized) without being burned in the oven's main chamber. The vapors are then burned in the afterburner chamber, but not before they have exercised the opportunity to plug water spray nozzles used to keep the volatilization of burnables in the main chamber under control. Such operation of a "pyrolysis oven", where there is no fire in the main chamber, is supposed to clearly distinguish its function, from that of a "pyrolysis furnace" in which there is. Nevertheless, the terms are often misused or interchanged, particularly in relation to devices using an afterburner in an afterburner chamber of the furnace, with no thought given as to the significance of where the fire is maintained.

It is now well-known that with high-polymer loads with the above-specified burnables content, the rise of temperature in the initial portion of the burn cycle was often uncontrollable, resulting in dense smoke and excessive temperatures in the main chamber. This occurred even when the furnace is constructed with a "vent number" greater than 0.003/ft found to be critical for normal operation. The vent number is computed by dividing the area of the vent (throat, ft$^2$) by the volume of the main chamber (ft$^3$).

The vapor to be incinerated is generated when mounting means for engines and electric motors (collectively referred to as "motor mounts"), and similar steel parts bonded to rubber; or, copper-containing electrical parts such as armatures, stators, transformers and the like; or, painted ferrous or non-ferrous steel parts; or, metallic bodies of arbitrary shape which are coated with, or bonded to polymeric materials (referred to herein as "polymer-bonded metal parts"), are to be pyrolized in a pyrolysis furnace.

Polymeric materials to be disassociated from metal parts are such materials as are commonly bonded to a metal substrate or matrix and include natural and synthetic elastomers; for example, natural rubber and synthetic rubber which are polymers of dienes; silicones which are polymers of siloxanes and the like; and, natural and synthetic resinous materials including natural shellac and synthetic plastics such as phenolics and acrylics, particularly paints. The difficulty of incinerating the materials smokelessly varies; silicones do not burn smokelessly, but silicone-free rubbers and paints can now be more reliably and economically incinerated, and smokelessly.

The foregoing polymeric materials are to be separated from the metal matrix to which they are bonded without melting the metal, and preferably, in most instances, without causing warpage or other undesirable deformation of residual metal matrix. It is self-evident that such separation may be effected by directly incinerating the polymeric materials, as is typically done in an incinerator for waste, but it is equally self-evident that the requirement of incineration without damaging the metal parts will not be met. Of course, damage to the parts can be minimized if only a few parts are incinerated together, but this method is undesirable because it does not lend itself to reclaiming a large enough mass of parts to be economical.

More so than the desirability of a smokeless discharge from the stack of a pyrolysis furnace, the desirablility of burning highly combustible burnables without an explosion cannot be overemphasized. It is common practice to operate such a furnace during the day in such a manner that the smoky discharge is not too objectionable, reserving such operation for darkness More responsible operators provide plural afterburners in series to make sure that as complete combustion as possible, is obtained. The seriousness of the problem is such that even in a drying furnace where a relatively small amount of contaminating oil is being burned, plural burners are used, as disclosed in U.S. Pat. Nos. 3,767,179 and 3,839,086 to Larson. The seriousness of explosions is measured in more dismal statistics.

Where the weight ratio (weight of burnables to be burned): (weight of metal) is relatively high, that is in the range from 0.1:1 to 2:1, a manufacturer of a prior art furnace advises against burning such loads. Attempts to burn even a small load result not only in the discharge of a highly noticeable stack gas, but also in the severe fouling of the furnace's main chamber, the controls, and, most important, of the water nozzles upon which the safe operation of the furnace is critically dependent.

An attempt to deal with the problem of fouling water spray nozzles is found in U.S. Pat. No. 4,557,203 to Mainord who uses a first sensor in the stack downstream of the afterburner to actuate a first set of nozzles; and a second sensor in the main chamber to actuate a second set of nozzles.

This invention is specifically directed to a pyrolysis furnace with a single thermocouple, located anywhere in the main chamber provided the temperature is "micro-ramped" to preselected progressively higher setpoints at a ramp not to exceed 2° F./min, preferably about 1° F./min, or less, the higher the HGF of the load, the lower the ramp rate. Moreover, a micro-ramp requires no initial soak period to bring the load to ignition temperature, no intervening soak intervals, and the main burner is never shut off during the entire burn period, that is, even after the a major portion, preferably at least 80 percent by weight (% by wt), and most preferably about 90% by wt of the burnables are burned. After the major portion of burnables is burned, the temperature is maintained constant during a final burn (referred to as the "final soak period") effected with the main burner being starved of fuel (at "low-fire"). The surprising result is that there is no explosion because there is never a runaway increase of temperature.

It is known that heating of the metal parts to 700°-800° F. in an enclosure with limited air intake will char or degrade all known combustible contaminants without ignition if the percentage of contaminants is less than about 2% by weight ("wt") of the parts. However, we are concerned with igniting much higher amounts of combustibles in the range from about 10% by wt of the load in the charge to about twice the weight of the load, or even more, and it is critical that the burning of the combustible not result in an explosion, yet produce an essentially smokeless stack.

It is unnecessary to point out that, when operating with highly flammable loads, under near-explosive conditions, a very small misstep can set off an explosion. The inability to control the burn when the ramp is set for more than 2° F./min is such a misstep. Our invention avoids such a misstep.

SUMMARY OF THE INVENTION

It has been discovered that a highly combustible load of burnables consisting essentially of an organic polymer bonded to a substrate, and likely to cause an explosion in a pyrolysis furnace, can be burned safely using a PC which controls the ramping of the temperature with increments in the range from about 0.5° F. per minute to no more than 2° F./min without shutting off the main burner during the entire burn cycle, that is, the time during which the load is burning, provided the temperature required by the slow ramp, is maintained by a water spray. The main burner is preferably a gas burner, and the water spray is ON during the ramp and the high-fire operation of the burner for a major portion of that burn period. The result is that the burn is controlled because the burnables are controlledly "drowned" or "showered" so an explosion is avoided.

The "micro-ramp" defined by such a slow ramp essentially eliminates "soak periods" before and during the ramp. The overall burn cycle typically eliminates an initial "soak" period to bring the load up to ignition temperature, but includes (i) a short period, about 1 minute, during which the operation of at least the primary water spray is checked; (ii) a ramp period during which the load is micro-ramped to the upper set-point; (iii) a high-fire burn period at the upper set-point, during each of which periods (ii) and (iii) the main burner is on "high-fire" (full or normal fuel supply); and (iv) a final burn during which the main burner is on "low-fire" (fuel-starved). The main burner always operates in the presence of an excess of oxygen, that is, more oxygen than stoichiometric required to burn the fuel in the main burner. The major portion of the organic material, preferably about 80% by wt, or more, is burned during periods (i)–(iii), and before the final burn period.

A micro-ramped burn allows the single thermocouple (T/C) in the main chamber to be located arbitrarily anywhere within it. Because the main burner remains ON continuously, no effort is made to seal out oxygen from the main chamber, other than maintaining a sealed door. During the final burn, the main burner is starved of fuel while the final temperature setting is maintained. Typically, the fuel supply to the burner is cut in half. The penalty for operation with a micro-ramped burn is that the main burn period (in the burn cycle) is lengthened appreciably, compared to the burn period for a burn according to the '298 patent.

More specifically, it has been discovered that substantially explosion-free operation and a smokeless stack are provided by controlling the burn cycle with a programmable temperature controller (PC) programmed with a microramped temperature profile essentially without soak periods during the micro-ramp, and the final burn being controlled by a fuel-starved main burner which is never shut off during the entire cycle, while the main chamber is always at negative pressure. The criticality of the placement of the TC is thus avoided.

It is therefore a general object of this invention to provide a controlled "burn cycle" for highly combustible burnables in a pyrolysis furnace having a main chamber, a main burner directly to heat air ducted into the chamber, a throat near the top of the main chamber through which throat organic vapor volatilized by incineration of the burnables leaves the main chamber, an afterburner chamber provided with an afterburner to incinerate said organic vapor downstream of the throat, an exhaust stack through which incinerated vapor is vented, a single TC located within the main chamber to sense the temperature of gases above the metal parts within the chamber, the improvement comprising, control means to maintain continuous operation of said main burner with (i) a normal, full supply of fuel necessary to maintain full-burning operation in the presence of an excess of oxygen during a major portion of the burn cycle, said excess of oxygen being relative to the amount required to burn the fuel in the main burner, and (ii) a diminished supply of fuel sufficient to maintain fuel-starved operation during the final portion of the burn cycle, also in the presence of an excess of oxygen;

programmable temperature control means (PC) which sets a required micro-ramped temperature in increments of no more than 2° F./min as a function of the heat generation factor ("HGF") of the burnables, and the size of the load to be burned, the PC being operatively connected with said TC;

primary water spray means, responsive only to said TC when the instantaneous temperature sensed by the TC in the main chamber exceeds said required temperature in the range from about 600° F. to 1100° F., so that water is sprayed above said metal parts into the main chamber during the burn cycle, to lower the temperature in the main chamber to said required temperature; and, secondary water spray means, responsive only to said TC when the instantaneous temperature sensed by the TC in the main chamber exceeds said required temperature by a predetermined amount in the range from about 5° F. to about 20° F., so that water is sprayed above said metal parts into the main chamber during the burn cycle, to lower the temperature in the main chamber to said required temperature; whereby said operation of the furnace is explosion-free.

It is a specific object of this invention to provide a method for burning highly combustible organic material with a load of metal parts in a pyrolysis furnace, smokelessly, the method comprising, (i) maintaining a controlled micro-ramp in the range from 0.5° F./min to 2° F./min during the initial portion of the burn cycle, while continuously maintaining a fire in the main chamber of the furnace, the fire being fed by a main burner operating under normal, high-fire conditions, until a major portion of the organic material is burned, (ii) sensing the temperature in the main chamber with a single TC and obtaining a required temperature in a ramp set in the range from about 0.5° F./min but no more than 2° F./min, unrelated to the time for the burn cycle, (iii) actuating a water spray in the main chamber to cool the burning load while the main burner remains on high-fire, when the required temperature is exceeded, and, (iv) completing the burn cycle with a final burn while the main burner operates at low-fire under fuel-starved conditions, whereby the operation of the furnace is essentially safe from explosion.

BRIEF DESCRIPTION OF THE DRAWINGS

The foregoing and other objects and advantages of our invention will appear more fully from the following description, made in connection with the accompanying drawings of preferred embodiments of the invention, wherein like reference characters refer to the same or similar parts throughout the views and in which.

DETAILED DESCRIPTION OF PREFERRED EMBODIMENTS

The most preferred embodiment of the invention derives from the use of a micro-ramped temperature profile set in a programmable controller means ("PC") which provides the required temperature ramp (that is, the gradient of temperature as a function of time) in the temperature profile monitored by a temperature sensing means (TC) in the main chamber. The required ramp consists of a multiplicity of individual ramps set at intervals of no more than 2° F./min, preferably about 1° F./min or less, hence "micro-ramped". This micro-ramping occurs while the main burner is on high-fire, that is, during the initial portion of the main burn period of the overall burn cycle, and the required temperature for the ramp is maintained by at least one, namely a primary water spray, and preferably two water sprays, the second being referred to as the secondary water spray.

The micro-ramped PC permits the single TC to be located anywhere in the main chamber, preferably in the upper portion, at a location in a sidewall, near the ceiling and near the throat. Additional TCs may be used, if desired, but are not necessary. In addition, the furnace is constructed with an adequate vent number, further to minimize the risk of explosions, as was disclosed in our '298 patent.

Figure 1:
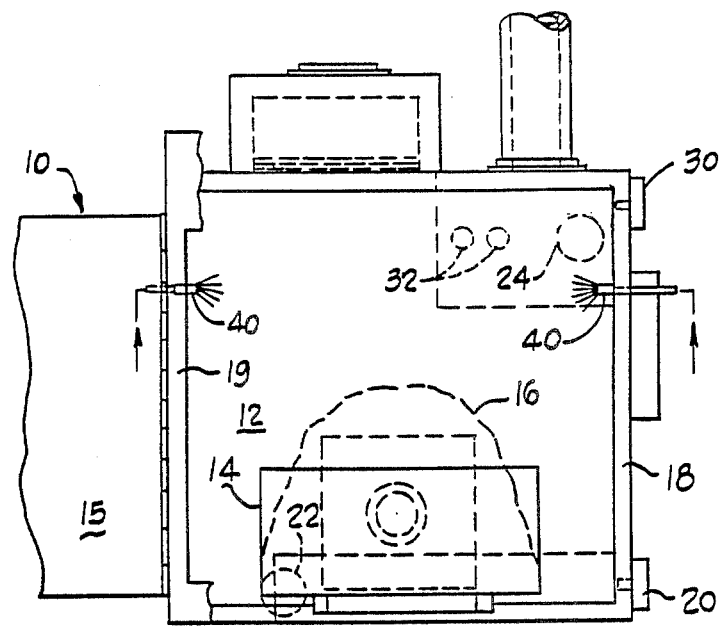
FIG. 1 is a front elevational view of a schematically illustrated pyrolysis furnace, with an open front door shown broken away, the operation of which furnace is controlled by the single TC and temperature control system of this invention.

The furnace and control system for its operation is diagrammatically illustrated in FIG. 1 which is a front elevational view of a pyrolysis furnace, indicated generally by reference numeral 10, which is typically a large structure shaped like a rectangular parallelepiped though the shape is not especially relevant to the function of the furnace. Within the furnace is a main chamber 12 onto the floor 13 of which a cart 14 is rolled through a door 15. The cart is loaded with polymer-bonded metal parts 16 to be pyrolized. The door 15, shown in the open position with a portion broken away, is in the front of the furnace which has a rear wall 17, right side wall 18 and left side wall 19. The door is gasketed with a suitable high temperature material to seal the main chamber during operation, and the interior surface of the door, like the interior of the main chamber, is insulated with ceramic fiber. After one load or charge is subjected to a pyrolysis or "burn cycle", another is introduced into the chamber and the cycle is repeated, which is why the furnace is referred to as a "batch" pyrolysis furnace.

At the far end of the chamber from the door, and behind the rear wall, is provided a direct heating means for air in the form of a main burner assembly, indicated generally by reference numeral 20, which includes a main burner removably inserted in a main burner firebox 21, air regulating means (not shown) to adjust the air and fuel flow to the burner, and associated hardware (not specifically shown) all of which is conventional and commercially available. A gas burner adapted to operate with either a normal or "full-burn" fuel supply, or a diminished fuel supply, as selected, is illustrated and preferred, though a second low-output main burner may be switched on, after the first main burner is shut off. It will be appreciated however, that the complications introduced by operating two main burners instead of one are such that such operation is not practical for common use. The function of the two main burners is neatly fulfilled by a single main burner which can be starved for fuel for low-fire operation.

The particular type of direct heating means for supplying hot air is not critical so long as it can provide enough heat to ignite the polymer on the metal parts once they have been brought up to temperature in the main chamber, and it can operate when the fuel supply is cut in up to about one-half its normal supply, or cut even more.

Most preferred is a main burner which burns natural gas fuel to produce an elongated flame which is adjusted to extend along substantially the entire length of the base of the rear wall 17 of the chamber. Hot combustion gases generated by the main burner flow into the main chamber through a burner passage 22 in rear wall 17. The burner passage 22, places the main chamber in open communication with the main burner firebox. The flame is adjusted to extend the length of the firebox with the tip of the flame playing at passage 22, the cross-sectional area of which is substantially the same as that of the sheath so that there is no significant restriction of circulation of the hot gases generated by the main burner. This ensures igniting the charge after it reaches ignition temperature.

The type of main burner chosen depends upon the size of the charge and chemical composition, hence the heat generation factor, of the polymer-coated substrate to be "burned", and the time constraints for doing so. For a typical main chamber having a width of 4 ft., a length of 4 ft., and a height of 4 ft., within which a charge of about 500 lb of motor mounts (25% by wt is rubber) is to be burned, a Midco Incinomite burner having a rated output of 100,000 BTU/hr is used. The load/volume ratio is about 7.8 lb/ft$^3$; and the burnables/metal ratio is 0.25. Operable load/volume ratios range from about 0.5 to about 15 lb/ft$^3$, it being readily realized that the lower ratio is not narrowly critical while a ratio higher than the upper ratio results in an unacceptable risk of explosion, the more flammable the organic material to be burned, the more sensitive is the furnace to improper loading.

This burner may be adjusted to throw a flame about 3 ft long, and the air intake to the burner can be controlled to ensure that the fuel burns with an excess of oxygen.

In the rear wall 17, and near the top thereof, diagonally from the burner passage 22, is a throat 24 through which hot gases generated in the main chamber leave it. The throat 24 places the main chamber 12 in open communication with an afterburner chamber 26 in which an after-burner assembly 30 is removably inserted The assembly 30 includes an afterburner, means for regulating the amount of natural gas burned, means for regulating the air flow to the burner, and associated hardware (not specifically shown) all of which are commercially available, for example in a Midco Incinomite burner (output 500,000 BTU/hr) assembly. The afterburner is adjusted to throw an elongated flame. All gases which leave the main chamber must flow through the throat 24 and come in contact with the afterburner flame in the afterburner chamber.

The diameter of the throat 24 is sized so as to provide a predetermined draft, whether natural or forced, in the main chamber during operation of the furnace. The type of polymer burned, the weight of polymer present on each charge, the volume of the main chamber, and the time in which each cycle is to be completed (that is, the charge is to be introduced, brought up to temperature, burned and cooled enough to withdraw the cart from the main chamber), inter alia, will determine the area.

In particular, when the mass flow rate of hot gases and vapor through the throat 24 exceeds a critical venting flow rate there is a rapid build-up of pressure, which build-up, if continued, results in an explosion. To avoid the explosion, the quantity "(area of the throat 24)/(volume of the main chamber 12)" must exceed 0.003/ft but preferably not exceed 0.015/ft. This quantity is referred to as the critical vent number.

For example, a furnace with a 4'(ft)×4'×4' main chamber required to burn a charge of about 500 lb of motor mounts consisting of 400 lb of steel and about 100 lb of rubber in a 6 hr cycle, requires a vent larger than 0.5 ft in diameter. The vent is too large when a desirable draft to ensure good flow through the stack cannot be maintained. An operable vent diameter is in the range from 8" (inches) to 10".

The afterburner chamber is provided with adjustable auxiliary air vents 32 through which fresh air is introduced to supply the necessary oxygen for complete combustion of the vapor flowing through the flame of the afterburner. The combustion gases from the afterburner chamber 26 flow upwardly through a stack 34 and are vented to the atmosphere.

As already pointed out, our system relies on sustaining a fire continuously in the main chamber controlled by the micro-ramped PC, so as not to trigger an explosion. However, to complete a "burn" of the charge within a few hours, usually from 4 to 12 hr, and generally no more than 8 hr, each cycle is completed within a period close to the minimum. Under such conditions the risk of an explosion is increased. Accordingly, as a precautionary measure, the furnace 10 is provided with an explosion control escape hatch 35 shown in phantom outline in an open position, and an escape hatch enclosure 36 which is vented to the atmosphere through a stack (not shown).

Under such conditions, we discovered that it is not critical where in the main chamber the TC measures temperature provided it is controlled by the micro-ramped PC which in turn controls the water spray for controlledly drowning the highly combustible load as it burns.

Though we know of no single criterion for anticipating when an explosion will occur during a cycle, we have found that programming the controlled upward ramping of temperature with a preset ramp of from about 0.5° F./min to about 1° F./min, essentially without any intermediate soak interval, avoids an explosion while incinerating a highly flammable high-polymer load smokelessly. Moreover, it is unnecessary to have an initial soak period to bring the load up to ignition temperature as is typically done in the prior art, though of course, such an initial soak may be used, if desired. The high frequency with which the primary water spray (and, often, also the secondary water spray) is actuated during the main burn period while the main burner is on high-fire makes it unnecessary to provide the initial soak period.

It is essential to provide TC 29 (T/C-4 in FIG. 4) in the main chamber. Additional TCs may be provided in the main chamber but provide no additional useful purpose and is not economically justified. This TC 29 senses the instantaneous temperature and conveys an electrical impulse corresponding thereto to the programmable controller PC which controls the progression of temperature (that is, the temperature profile of the ramp over the major portion of the burn in a single burn cycle). Actuation of the water spray, while the main burner operates continuously under high-fire conditions until about 90% by wt of the organic material is burned off, is controlled by the TC-29 in conjunction with the PC.

The PC preferably has 3 outputs and 1 temperature input where both primary and secondary water spray systems are desired. Typically, ouput #1 actuates the primary water spray system; alarm #1 actuates the secondary water spray system; and alarm #2 controls the temperature in the main chamber.

The TC-29 (T/C-4) transmits signals to control means 37 mounted on an electrical panel 33, shown mounted on the right side wall 18, and controls the burn-out of a charge as described hereinafter.

By controlling only the ramped temperature in very small increments, that is, the instantaneous temperature sensed by TC 29 (T/C-4) while the main burner is continuously ON either high-fire or low-fire, we are able to avoid uncontrolled combustion within the furnace. When the temperature sensed by T/C-4 exceeds the required temperature, an appropriate reduction of the temperature is called for by the PC. A commercially available PC for the purpose is a West 2050 or 2052 available from West Division of Gulton Industries.

The PC actuates a primary water spray means which sprays water on the burning load through nozzles 40 disposed within the main chamber, near the top thereof. If the temperature nevertheless exceeds a pre-set deviation, say 10° F., which is above the profile of the micro-ramp programmed by the PC, a further reduction in temperature is effected by a signal from the PC which actuates a secondary water spray without attenuating the main burner.

In a particular embodiment, the temperature profile for a burn cycle includes (i) a micro-ramp in 1° F./min increments uninterrupted by any soak periods to the burn temperature $T_f$, which is a desired "hi-fire" temperature in the range from about 750° F. to 1000° F., typically 800° F. This $T_f$ at the end of the micro-ramp is maintained for a soak period (Dwell$_f$) while the main burner is continuously burning with a full-burn using a normal fuel supply; and, the burn cycle concludes with (ii) a low-burn, the main burner burning at low-fire with a diminished fuel supply, typically one-half normal flow.

The soak period (Dwell$_f$) for the major burn is typically set in the range from 1 to about 12 hr (say 2.5 hr) depending upon the amount of burnables in the load, the HGF for the type of organic material being burned, and other operating variables. A period for the low-fire burn, in the range from 1 to about 18 hr (say 10 hr) is also set. The precise temperature steps for the ramp, and the time for the high-fire and low-fire burns, are set by simple trial and error.

Figure 3:
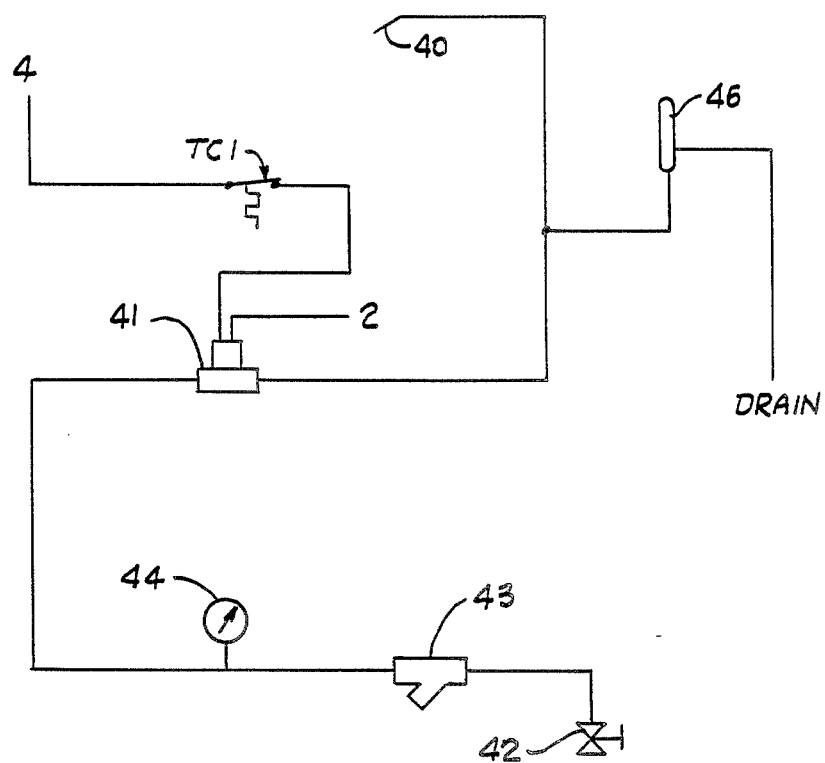
FIG. 3 is a diagrammatic illustration of a piping system for a water spray actuated by the control system for the furnace.

When the temperature set by the ramp profile is exceeded, as it will be, a signal (output #1) from the PC turns the water spray on. If a secondary water spray is provided in addition to the primary, the latter primarily controls the ramp. In the primary water spray system, the spray nozzles' combined output depends upon the size of the main chamber, the size of a normal charge to be burned, and the amount of polymer to be burned. When the additional, secondary water spray means is used, it is also operated by the PC (alarm #1). Less than 1 gpm of water is typically adequate for the primary spray, from about 0.1–0.5 gpm being most preferred in a 64 ft$^3$ main chamber. The piping of the primary water system is schematically illustrated in FIG. 3 along with a portion of the electrical circuit for control of the solenoid 41.

Water from a water supply line under normal pressure of about 50 psig flows through gate valve 42 which is always open, then through strainer 43, and is stopped at the normally closed solenoid 41. A pressure gauge 44 senses line pressure. If the water pressure exceeds 175 psig it is relieved by a poppet type pressure relief valve 46. Upon signal from TC 29 (T/C-4) the solenoid 41 opens and water is sprayed through the nozzles 40. When the temperature falls sufficiently, the water spray is stopped.

When the furnace is started, a relay in the burner is energized to start the blower motor. This closes the centrifugal switch on the motor and energizes the electronic ignition system. After a short delay, both the pilot valve and ignition are energized. Once the pilot is proven, the ignition is shut off and within one second the main valve opens. The afterburner stays on high-fire for the complete cycle. When the setpoint on the PC is reached and exceeded, the main burner stays on.

Figure 4:
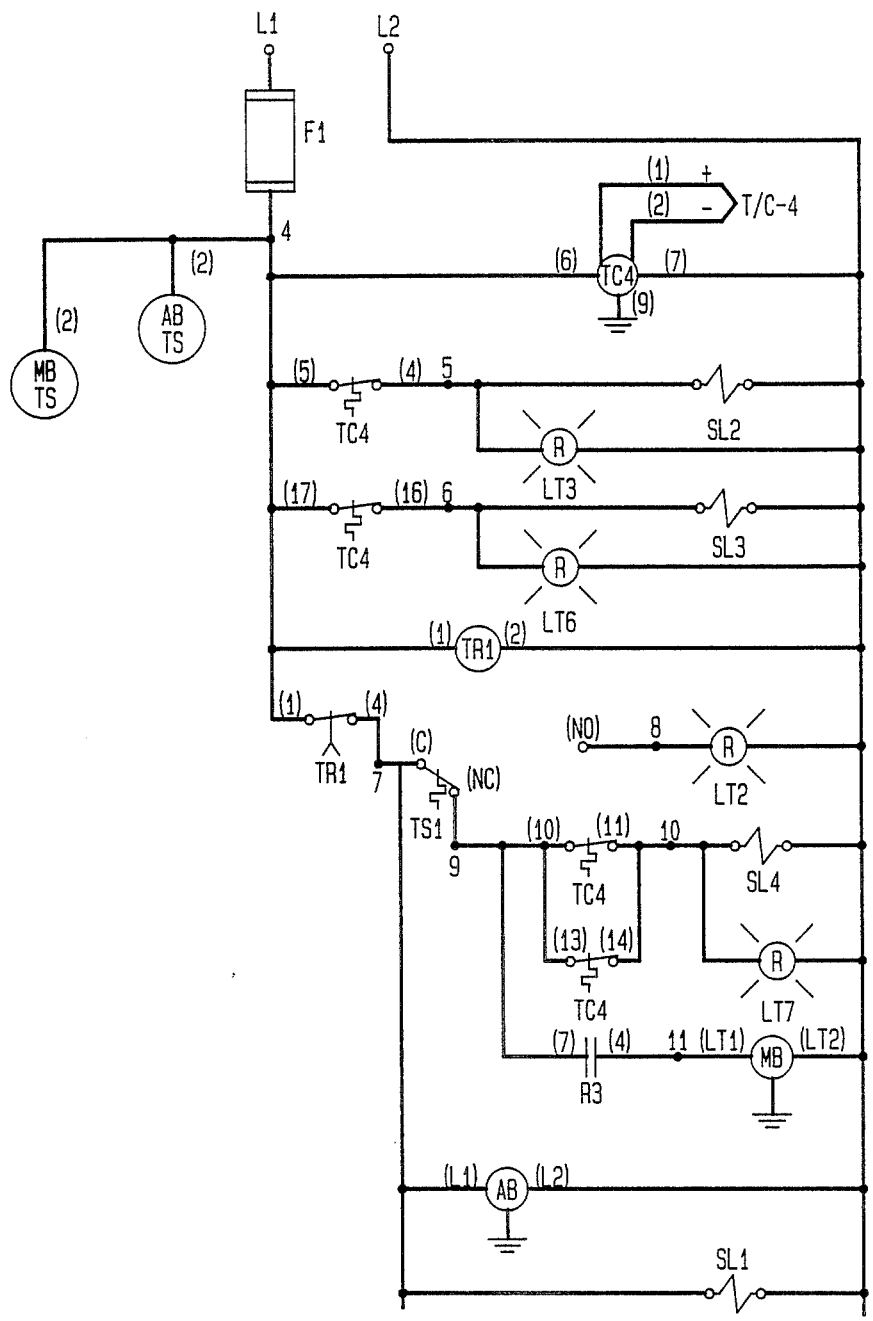
FIG. 4 is an electrical schematic for the control system.

Referring now to FIG. 4 there is shown a diagram for an electrical circuit for operation of the furnace with 120 volt (single phase) power supplied to terminals L1 and L2, the latter being neutral. The furnace is turned on with the timer TR1. With power at #7 the electrical circuit is energized. The cycle timer motor TR1 is now operating and the programmable temperature controller TC4 (7 & 8) has power supplied to it. The gas shut-off solenoid SL1 will also be energized and actuate the gas valve (associated with the solenoid) to open it (the valve). The afterburner AB (1 & 2) will also be energized, go through its ignition sequence, and light up. The afterburner AB and gas solenoid SL1 will remain ON for the rest of the cycle.

The overall burn cycle is started (with a "run" button) and it is preferred to check the operation of the primary and secondary water sprays for about 1 min. As a safety precaution, the furnace cannot be started if at least the primary water spray is not functioning. The cycle timer is started by closing switch TR-1. The afterburner turns on and then the main burner until the microramp ramps up to the high-fire set-point. When the set-point is exceeded by the temperature step set for the ramp, say 1° F., the primary water spray is actuated. If the instantaneous temperature exceeds the set-point by the pre-set deviation, say 10° F., the secondary water spray is also actuated.

After the desired dwell set for the high-fire burn, the main burner is switched to a low-fire, fuel-starved operation (the event output is zero), only about one-half of the normal flow of gas being fed to the burner through a by-pass containing a limiting orifice valve (not shown) by closing (de-energizing) solenoid SL-4. The furnace continues to operate with the main burner on low-fire until the end of the cycle, the switch (10)(11) cycling to high-fire operation to maintain the set temperature.

Figure 5:
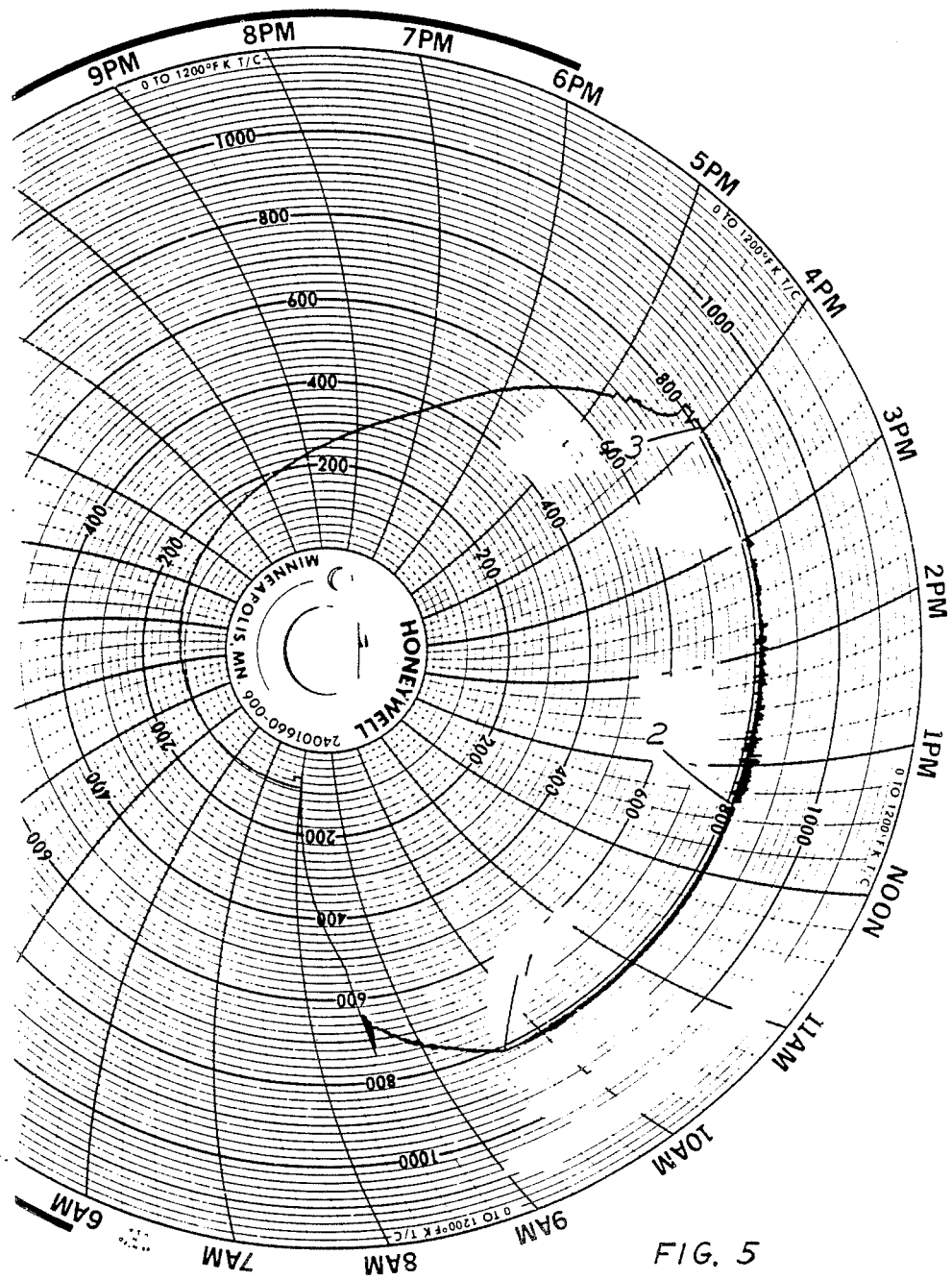
FIG. 5 is a chart from a temperature recorder which recrods the temperature sensed by the TC in the main chamber during a burn cycle in which metal fixtures coated with an asphalt paint having a median heat generation factor (HGF about 5) are burned with a ramp set at 2.2° F./min, without an initial soak period, showing the sudden wide variation in temperature during the ramp.

It is only because of the closely set temperatures between which the main burner switches from low-fire to high-fire that such switching can be effected without an explosion. A setting greater than 5° F. is unsafe for highly combustible burnables. A setting greater than 2° F., in the range from 2–3° F. results in relatively large fluctuations in temperature in the main chamber, as is seen in FIG. 5, after the high-fire, main burn period is completed, indicated by reference numeral 2.

As long as the furnace temperature remains below 1200° F., which is a preset temperature, power will flow through main burner MB over-temperature control TS1 (C & NC). R3 closs which permits the main burner MB to come on. The main burner stays ON as long as TR1 is closed.

When the furnace temperature exceeds 1200° F., MB over-temperature control TS1 contact (C & NC) will open and deenergize the main burner MB (1 & 2). Over-temperature control contact (C & NO) will close and the red high limit (over-temperature) light LT2 comes on. If, after having exceeded the preset temperature of 1200° F. the furnace temperature drops below 1200° F., MB over-temperature control TS1 must be manually reset. When switch TS1 is reset, contact (C & NO) opens and turns off the red over-temperature light LT2. Contact (C & NC) closes and supplies power to T/C-4 (10 & 11). This switch opens and closes around the furnace set-point. A separate switch (13 & 14) is also provided for T/C-4. This switch (13 & 14) is controlled by the event output. When the ouput is 1, the switch is open; when the output is 0, it is closed.

As an illustration, T/C-4 is connected to the PC which is programmed with a micro-ramp from 600° F. to 800° over a period of 2.5 hr with no intermediate soaking steps so that the profile of the micro-ramp is a line with a gradient of 200° F. over 2.5 hr; and a Dwell$_f$ of 2.5 hr at 800° F. for the high-fire major burn; then, 3 hr for the low-fire final burn.

When the temperature in the main chamber exceeds a point on the micro-ramp profile as set in the PC, the solenoid SL-2 for the primary water spray will be energized, the red light LT3 goes on and the water valve associated with the solenoid is opened. Water is sprayed in a mist (or, finely divided stream of droplets) until the temperature in the main chamber drops below the set point and the water solenoid is de-energized. By measuring the time during which the light LT3 stays ON during the main burn, that is from the time the micro-ramp is started until the main burner is switched to low-fire, it is found that the light stays on for more than one-half the period required for the main burn (therefore referred to as a controlled drowning of the burning load).

When the instantaneous temperature sensed by TC-4 exceeds a preset amount, typically about 10° F., above the temperature required by the ramp setting, the secondary water spray is actuated when switch (16)(17) is closed, opening solenoid SL-3. Light LT6 indicates the secondary water spray has been actuated.

As already pointed out, both the high-fire and low-fire burns are conducted with an excess of oxygen which is particularly critical during the low-fire burn so that the relatively small amount of combustible material left will burn steadily without sudden build-ups in temperature which will actuate the water spray. Excess air in the main chamber is provided through the main burner ports, and, to the afterburner chamber, through ports in the afterburner chamber.

Figure 2:
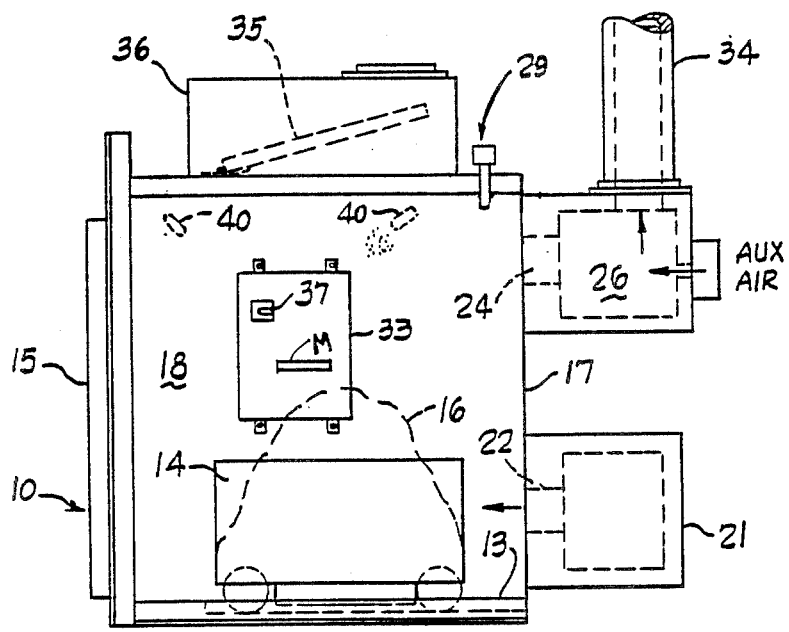
FIG. 2 is a side elevational view of the furnace showing a preferred location in the main chamber of the single thermocouple (TC) operatively connected to a programmable control means (PC) adapted to be set for increments of less than about 5° F. in a predetermined range essential for burning the organic material essentially completely.

At all times during the burn cycle, it is critical that the main chamber operates at negative pressure. The pressure in the main chamber is monitored by a manometer M (FIG. 2), preferably a recording manometer, conveniently mounted outside of and on one side of the chamber, or on an instrument panel. A typical burn is conducted with a negative pressure in the range from about 0.01" to about 0.4" (inches) of water column, more preferably 0.01"–0.30" using either a natural draft or forced draft exhaust. The negative pressure allows excess oxygen into the afterburner chamber both, to avoid an explosion and to ensure a smokeless stack. An explosion results from a run-away fire and a positive manometer pressure.

The PC is provided with one or more set points corresponding to a deviation(s) which may be pre-set. For example, a first deviation of 25° F. is set in the PC which deviation is maintained over the profile of temperature of the entire cycle, so that if the temperature sensed by T/C-4 exceeds the instantaneous temperature on the profile by 25°, an additional event to help cool the load may be set-off, as for example, a secondary water spray (not shown) may be actuated. If two set-points are provided for two deviations, one deviation may be set for 25° F. (say) to actuate the second water spray, and the other deviation may be set for 50° to shut off the main heat source, or to trigger an alarm. Still another alternative is to use a single set-point for a deviation to actuate the second water spray as well as shut off the main heat source.

At the end of the cycle, the cycle timer contacts TR1 (C & NO) will open and de-energize the circuit. The furnace is shut off.

Referring again to FIG. 5, the chart records a ramp from ambient temperature, about 80° F., in the main chamber, to 800° F. over a period of 1.5 hr with the ramp set for 8° F./min. As is evident, before the ramp is completed at its set-point of 800° F., indicated by reference numeral 1, there is a sudden large fluctuation in temperature at about 700° F., which is brought under control by the secondary water spray. The high-fire is switched to low-fire 3 hr after the ramp reaches its set-point, the switch being indicated by numeral 2, and there is substantial fluctuation in temperature while the main chamber is maintained under low-fire conditions. The main burner is shut off after an additional about 3.5 hr, indicated on the chart by numeral 3, and the load is allowed to cool.

Figure 6:
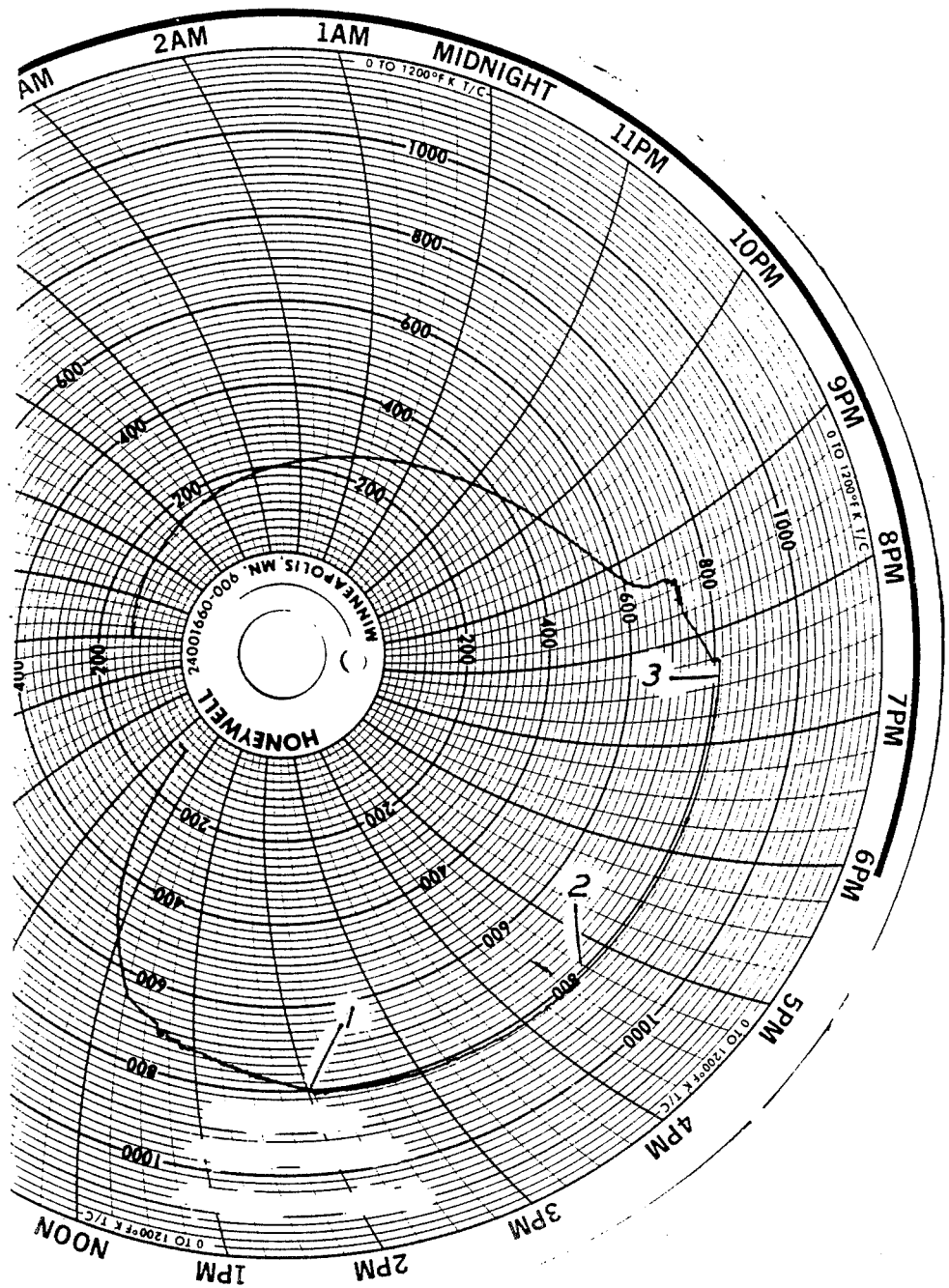
FIG. 6 is a chart similar to the one shown in FIG. 5, for a "burn" of parts coated with an enamel paint having a HGF about the same as that of asphalt paint, except that the ramp is set at 1.3° F./min, showing the smoothly controlled ramp.

Referring now to FIG. 6, the chart records a ramp from ambient temperature, about 80° F., in the main chamber, to 800° F. over a period of 2.5 hr with the ramp set for 5° F./min. As is evident, the ramp is completed at its set-point of 800° F., indicated by reference numeral 1, with no significant fluctuation in temperature. The high-fire is switched to low-fire 2.5 hr after the ramp reaches its set-point, the switch being indicated by numeral 2, and there is no significant fluctuation in temperature while the main chamber is maintained under low-fire conditions. The main burner is shut off after an additional about 3 hr, indicated on the chart by numeral 3, and the load is allowed to cool.

In a typical burn, the main chamber is loaded with a "full" load having a known HGF, the weight of the load being determined from experience as that amount which can be burned safely within a specified period, typically 8 hr. The primary water spray will typically remain ON for a major portion of the time during the ramp, and often during a major portion of time during the high-fire burn. The precise fraction of time during which the primary water spray will be ON will depend upon not only upon the size of the load, but upon its HGF and the gradient of the ramp set. The primary water spray will be ON sparingly, if at all, during the low-fire burn.

From the foregoing description of the best mode of operating the furnace it will be seen that avoiding an explosion, is predicated upon maintaining (a) operation of the main burner at all times during the cycle so that there is never a sudden build-up of volatiles which can be ignited by the burning mass in the presence of oxygen leaking into the main chamber; and, (b) negative pressure in the main chamber at all times while the main burner is ON. The effectiveness of the control system is based on control of the micro-ramp and the periods for the high-fire and low-fire burns, which control is provided by the PC operatively connected with the TC-4.

We claim:

1. In a pyrolysis furnace having
   a main chamber,
   a main burner to directly heat air ducted into said chamber,
   a throat near the top of the main chamber through which throat organic vapor volatilized by pyrolysis of burnables leaves the main chamber, said throat having an area, and said main chamber having a volume which are related such that their ratio is always greater than the critical vent number 0.0003/ft,
   an afterburner chamber provided with an afterburner to incinerate said organic vapor downstream of said throat, a single temperature sensing means (TC) located within the main chamber to sense the temperature of gases above the metal parts within the chamber, and,
   an exhaust stack through which incinerated vapor is vented,
   the improvement comprising,
   control means to maintain continuous operation of said main burner with (i) a normal, full supply of fuel necessary to maintain full-burning operation in the presence of an excess of oxygen during a major portion of the burn cycle, said excess of oxygen being relative to the amount required to burn the fuel in the main burner, and (ii) a diminished supply of fuel sufficient to maintain fuel-starved operation during the final portion of the burn cycle, also in the presence of an excess of oxygen;

manometer means to monitor the pressure in said main chamber and to ensure that said pressure is negative while said main burner is ON;

programmable temperature control means (PC) for setting a required micro-ramped temperature in increments of no more than 2° F./min as a function of the heat generation factor ("HGF") of the burnables, and the size of the load to be burned, the PC being operatively connected with said TC;

primary water spray means, responsive only to said TC when the instantaneous temperature sensed by the TC in the main chamber exceeds said required temperature in the range from about 600° F. to 1100° F., so that water is sprayed above said metal parts into the main chamber during the burn cycle, to lower the temperature in the main chamber to said required temperature; and, secondary water spray means, responsive only to said TC when the instantaneous temperature sensed by the TC in the main chamber exceeds said required temperature by a predetermined amount in the range from about 5° F. to about 20° F., so that water is sprayed above said metal parts into the main chamber during the burn cycle, to add to the water sprayed by said first water spray means so as to lower the temperature in the main chamber to said required temperature;

whereby location of said TC in said main chamber is arbitrary, said operation of the furnace is explosion-free, and said incinerated vapor leaving said exhaust stack is permeable to light in the visible wavelength range.

2. The pyrolysis furnace of claim 1 wherein said burnables are articles coated with synthetic resinous material having a heat generation factor in the range from 1 to about 10, on a scale wherein metal motor mounts bonded to butyl rubber is 1, and metal fixtures coated with nitrocellulose paint is about 9.

3. The pyrolysis furnace of claim 2 wherein said micro-ramped temperature is set in increments in the range from about 0.5° F. to 1.5° F.

4. The pyrolysis furnace of claim 2 wherein said programmable controller includes a setting for about a 10° F. deviation of temperature in excess of said required temperature, and, said control means shuts off said main burner only after said burn cycle is completed.

5. The pyrolysis furnace of claim 2 wherein the ratio of the weight of the load (lb)/volume of the main chamber (ft$^3$) is in the range from about 0.5 to about 15 lb/ft$^3$, and, the weight ratio of burnables/metal in the load is in the range from 0.1 to about 2.

6. A method for operating a pyrolysis furnace to burn combustibles with essentially no visible smoke emanating from its stack, without catalytically converting gases in said stack, said method comprising, (i) maintaining a fire while operating a main burner at a first high-fire level in a high-polymer load of metal parts in the furnace's main chamber, said parts being pyrolized under a controlled ramp, less than 2° F. per minute, in microsteps for each of which a required temperature is set as a function of the heat generation factor for said combustibles, and the size of the load to be burned, but unrelated to the the time required for a burn cycle;

(ii) actuating a water spray when said required temperature is exceeded, to cool the burning load to said required temperature;

(iii) completing the burn cycle with a final burn while the main burner operates at a second low-fire level in the presence of an excess of oxygen; and, (iv) maintaining a negative manometer pressure reading within said main chamber during operation of the main burner at said high-fire and low-fire levels;

whereby the operation of the furnace is essentially safe from explosion and combustion of said combustibles is so complete that products of combustion from the stack are essentially smokeless.

7. The method of claim 6 including, sensing the temperature within said main chamber in the upper portion thereof, to sense the temperature of gases above said metal parts therewithin; and, spraying water into a zone above the load in said main chamber when the temperature in the main chamber exceeds a predetermined instantaneous critical temperature in the range from about 600–1100° F., so as to lower the temperature in said main chamber below said required temperature.

8. The method of claim 7 wherein the ratio of the weight of the load (lb)/volume of the main chamber (ft$^3$) is in the range from about 0.5 to about 15 lb/ft$^3$; and the weight ratio of burnables/metal in the load is in the range from about 0.1 to about 2.

9. The method of claim 7 wherein the water is sprayed in said primary water spray at a rate less than 1 gpm when said spray is turned ON.

10. The method of claim 8 wherein said primary water spray is ON for a major portion of the period during which said main burner is operating at a high-fire level when said furnace is provided with a full load.

* * * * *